(12) United States Patent
Toukura et al.

(10) Patent No.: US 6,565,481 B2
(45) Date of Patent: May 20, 2003

(54) INPUT TORQUE LIMITING DEVICE FOR AN INFINITELY VARIABLE TRANSMISSION

(75) Inventors: Nobusuke Toukura, Yokosuka (JP); Masayuki Yasuoka, Yokohama (JP); Hirofumi Shimizu, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/891,361

(22) Filed: Jun. 27, 2001

(65) Prior Publication Data

US 2002/0004438 A1 Jan. 10, 2002

(30) Foreign Application Priority Data

Jul. 10, 2000 (JP) ........................................ 2000-208590

(51) Int. Cl.⁷ ............................................... B60K 41/04
(52) U.S. Cl. ........................ 477/107; 477/110; 477/41; 476/33; 476/42
(58) Field of Search ................... 477/107, 110, 477/39, 41, 23; 476/29, 33, 42; 701/51, 54

(56) References Cited

U.S. PATENT DOCUMENTS

| | | | | |
|---|---|---|---|---|
| 3,897,697 A | * | 8/1975 | Chambers et al. | 142/42 |
| 5,233,530 A | * | 8/1993 | Shimada et al. | 123/350 |
| 5,738,606 A | * | 4/1998 | Bellinger | 477/111 |
| 5,738,608 A | * | 4/1998 | Long | 475/127 |
| 5,803,862 A | * | 9/1998 | Ochiai et al. | 477/45 |
| 6,148,257 A | * | 11/2000 | Katakura et al. | 477/37 |
| 6,269,296 B1 | * | 7/2001 | Toukura et al. | 701/65 |
| 6,359,404 B1 | * | 3/2002 | Sugiyama et al. | 180/65.2 |

FOREIGN PATENT DOCUMENTS

JP 10-267117 10/1998

* cited by examiner

*Primary Examiner*—Sherry Estremsky
*Assistant Examiner*—Tisha D. Lewis

(57) ABSTRACT

An input torque limiting device for an infinitely variable transmission connected to an engine, wherein the transmission can vary a speed ratio up to infinity. In the input torque limiting device, the maximum torque which can be input is computed according to the output/input speed ratio which is an inverse of the speed ratio, without adversely affecting the durability and performance of the infinitely variable transmission, and the engine torque is controlled not to exceed the maximum torque. In this way, in the infinitely variable transmission, input of an excessive torque when the speed ratio is in the vicinity of infinity is prevented.

3 Claims, 14 Drawing Sheets

INPUT TORQUE LIMITING DEVICE FOR AN INFINITELY VARIABLE TRANSMISSION

FIELD OF THE INVENTION

This invention relates to a device for limiting the input torque of an infinitely variable transmission used in vehicles.

BACKGROUND OF THE INVENTION

Tokkai-Hei 10-267117 published by the Japanese Patent Office in 1998 discloses an infinitely variable transmission (IVT) which enables control of a speed ratio to infinity by combining a continuously variable transmission (CVT) and a planetary gear set, in order to enlarge the speed change region of the continuously variable transmission.

In this infinitely variable transmission, the speed ratio (referred to hereafter as IVT ration ii) of the infinitely variable transmission is continuously controlled according to the difference of the speed ratios of the CVT and a fixed speed ratio transmission, from a negative value to a positive value including an infinite (geared neutral point GNP). At the geared neutral point GNP the output rotation of the IVT is zero, and the output rotation of the IVT changes direction.

Further, in this IVT, the CVT is controlled to reduce change-over shocks, such as due to the operation of a selection lever, when acceleration starts in the vicinity of the geared neutral point.

In this control, the CVT is controlled so that the output shaft torque of the IVT is suppressed in a predetermined time from when there is a change-over from a non-running range to a running range.

SUMMARY OF THE INVENTION

However, in the aforesaid IVT, as the speed ratio is infinitely large at the geared neutral point, the torque amplification factor from the input shaft to the output shaft is a very large value. The input and output shafts of the CVT are connected via a planetary gear set and fixed speed ratio transmission mechanism, so the IVT output shaft torque which is largely amplified in the vicinity of the geared neutral point also largely influences the input shaft.

Therefore, when the engine connected with the CVT generates a large engine torque in the vicinity of the geared neutral point, a very large torque will act on the parts of the CVT. In the aforesaid prior art IVT, when the output torque of the IVT becomes a large value, the CVT tends to be controlled to avoid this.

However, as the engine output torque response characteristics are generally steeper than the speed ratio response characteristics of the CVT, the durability of the CVT may decrease and the desired speed ratio may no longer be obtained due to the deformation of the parts of the CVT when the engine torque input to the CVT is too large.

It is therefore an object of this invention to prevent excessive torque from being input into an infinitely variable transmission when the speed ratio of the infinitely variable transmission is close to the geared neutral point.

In order to achieve above objects, this invention provides an input torque limiting device for an infinitely variable transmission connected to an engine of a vehicle, into which the torque from the engine is input and which can vary a speed ratio to infinity, the limiting device comprising a sensor for detecting an output/input speed ratio of the infinitely variable transmission which is an inverse of the speed ratio and a microprocessor.

The microprocessor programmed to compute an input torque limit according to the output/input speed ratio of the infinitely variable transmission as the maximum torque which can be input without adversely affecting the durability and performance of the infinitely variable transmission, and control the engine torque not to exceed the input torque limit.

The details as well as other features and advantages of this invention are set forth in the remainder of the specification and are shown in the accompanying drawings.

DESCRIPTION OF THE PREFERRED EMBODIMENTS

Figure 1:
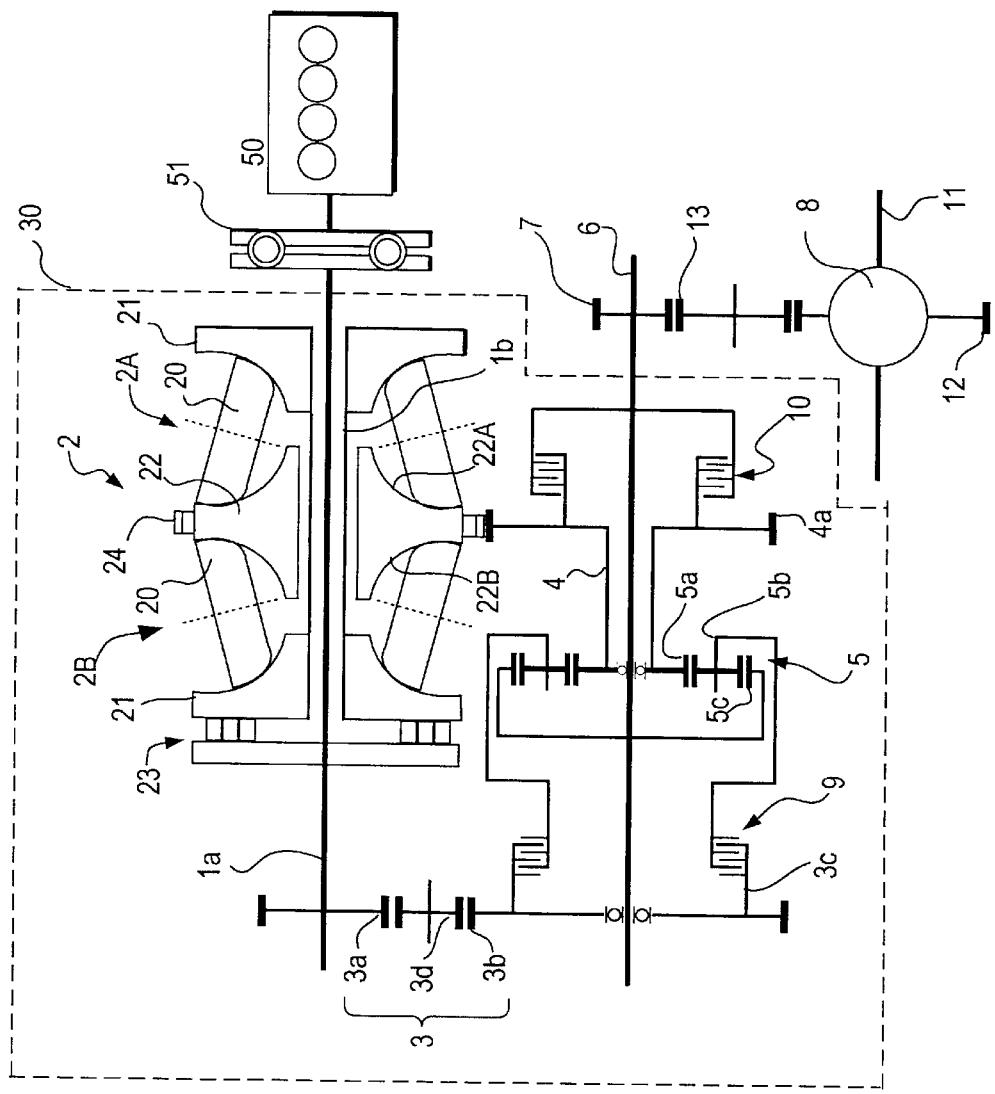
FIG. 1 is a schematic view of a vehicle drive system according to embodiments of the present invention.

Referring to FIG. 1, a toroidal continuously variable transmission (CVT) comprising two sets of toroidal speed change units is applied to an infinitely variable transmission (IVT) 30 according to the present invention.

The toroidal CVT 2 and a fixed speed ratio transmission 3 (reduction gear) are provided in parallel on an input shaft 1a of an IVT 30. The toroidal CVT 2 can continuously vary a speed ratio. The fixed speed ratio transmission 3 with a fixed gear ratio comprises a gear 3a, counter gear 3d and gear 3b.

An input shaft 1a of the IVT 30 is connected with the crankshaft of an engine 50 via a mass damper 51. A CVT output shaft 4 of the toroidal CVT 2 and a gear output shaft 3c of the fixed speed ratio transmission 3 are disposed on the side of the final output shaft 6. These output shafts 4, 3c are connected by the planetary gear set 5. The CVT output shaft 4 is connected to a sun gear 5a of the planetary gear set 5, and the gear output shaft 3c is connected to a carrier 5b of the planetary gear set 5 via a power circulation mode clutch 9.

The CVT output shaft 4 is supported coaxial with and free to rotate relative to the final output shaft 6, and is connected to an output gear 24 of the CVT 2 via a gear 4a. One end of the CVT output shaft 4 is joined to the sun gear 5a of the planetary gear set 5, and the other end of the CVT output shaft 4 is joined to the final output shaft 6 via a direct mode clutch 10.

The gear output shaft 3c joined to the gear 3b is also supported coaxial with and free to rotate relative to the final output shaft 6. A ring gear 5c of the planetary gear set 5 is joined to the final output shaft 6 which is the output shaft of the IVT 30.

A transmission output gear 7 is provided on the final output shaft 6. This transmission output gear 7 engages with a final gear 12 of a differential gear set 8 via the counter gear 13. A drive force from the transmission output gear 7 is transmitted to a drive shaft 11 joined to the differential gear set 8.

In the above infinitely variable transmission 30, the direct mode and power circulation mode can be used selectively. In the direct mode, the power circulation mode clutch 9 is disengaged, while the direct mode clutch 10 is engaged. Also in the direct mode, a drive force is transmitted according to the speed ratio (referred to hereafter as the CVT ratio ic) of the toroidal CVT 2. In the power circulation mode, the power circulation mode clutch 9 is engaged while the direct mode clutch 10 is disengaged. In the power circulation mode, a speed ratio (IVT ratio) ii of the IVT 30 is controlled according to the difference between the CVT ratio ic and the fixed speed ratio of the fixed speed ratio transmission 3. Here, the IVT ratio ii is obtained by dividing the rotation speed Ni of the input shaft 1a by the rotation speed No of the final output shaft 6.

The IVT ratio ii is continuously controlled from a negative value (reverse) to a positive value (forward) including infinity (geared neutral point GNP). (herein, the geared neutral point GNP is a change-over point at which the output rotation No of the final output shaft 6 of the IVT is zero, and at which the output rotation of the IVT changes direction). At the geared neutral point GNP, the vehicle is in the stationary state.

In the toroidal CVT 2, two input disks 21 and one output disk 22 disposed coaxially on the CVT input shaft 1b, gripping power rollers 20. A first toroidal gear part 2A is disposed on the side of an engine 50 and a second toroidal gear part 2B is disposed on the side of the fixed speed ratio transmission 3.

The output disk 22 is formed in one piece with cavities 22A, 22B formed by toroidal grooves on both sides in the axial direction. An output gear 24 is joined on the outer circumference of the output disk 22. The CVT shaft 1b passes through the inner circumference of the output disk 22, and is supported free to perform relative rotation and to displace in an axial direction. A gripping pressure is thereby applied according to the torque from the input shaft 1a due to a cam roller device 23 on the side of the second toroidal gear part 2B.

Figure 2:
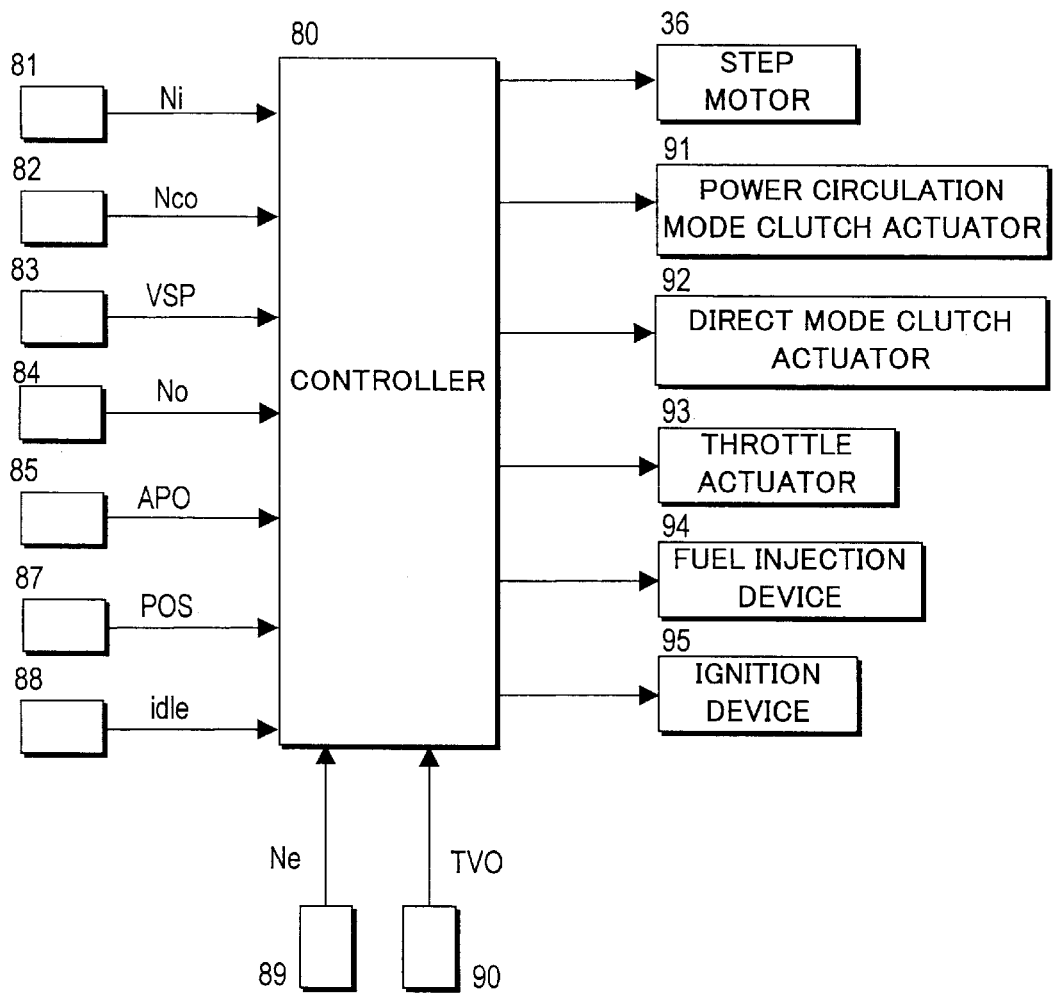
FIG. 2 is a schematic view of an input torque limiting device of an infinitely variable transmission according to embodiments of the present invention.

FIG. 2 shows a controller 80 which controls the IVT 30 and the engine 50. The controller 80 comprises a microprocessor having a central processing unit (CPU), read-only memory (ROM), random access memory (RAM) and input/output interface (I/O interface).

The controller 80 is connected with an input shaft rotation speed sensor 81 for detecting a rotation speed Ni of the input shaft 1a, a CVT output shaft rotation speed sensor 82 for detecting a rotation speed Nco of the CVT output shaft 4, a vehicle speed sensor 83 for detecting a vehicle speed VSP, a final output shaft rotation speed sensor 84 for detecting a rotation speed No of the final output shaft 6, an accelerator depression amount sensor 85 for detecting an accelerator pedal depression amount APO, an inhibitor switch 87 for detecting a selector position POS of a shift lever, an idle switch 88 for detecting a released state of the accelerator pedal, an engine rotation speed sensor 89 for detecting an engine rotation speed Ne, and a throttle-valve sensor 90 for detecting a throttle opening TVO.

The controller 80 increases or decreases the difference of oil pressure from two directions acting on a trunnion for holding the power roller 20, not shown, by assigning a step number to a step motor 36. The power roller 20 gyrates due to the displacement of the trunnion as a result of the increase or decrease of the difference in the oil pressure, and the speed ratio of the CVT 2 therefore varies.

A target IVT ratio tii is calculated based on the detection values of the above sensors. The step motor 36 is driven to control the CVT ratio ic so that this target IVT ratio tii is realized. Further, the controller 80 controls the engaging state of the power circulation mode clutch 9 and direct mode clutch 10 by driving a power circulation mode clutch actuator 91 or a direct mode clutch actuator 92.

The controller 80 controls the torque of the engine 50 by driving a throttle actuator 93 which controls a throttle opening, fuel injection device 94 which controls a fuel injection amount, ignition device 95 which controls an ignition timing or a combination of these, according to a running state of the vehicle. The torque of the engine 50 is equal to the input torque of the IVT 30.

Next, the first embodiment of the control process performed by the controller 80 will be described referring to the block diagrams of FIG. 3 and FIG. 4.

Figure 3:
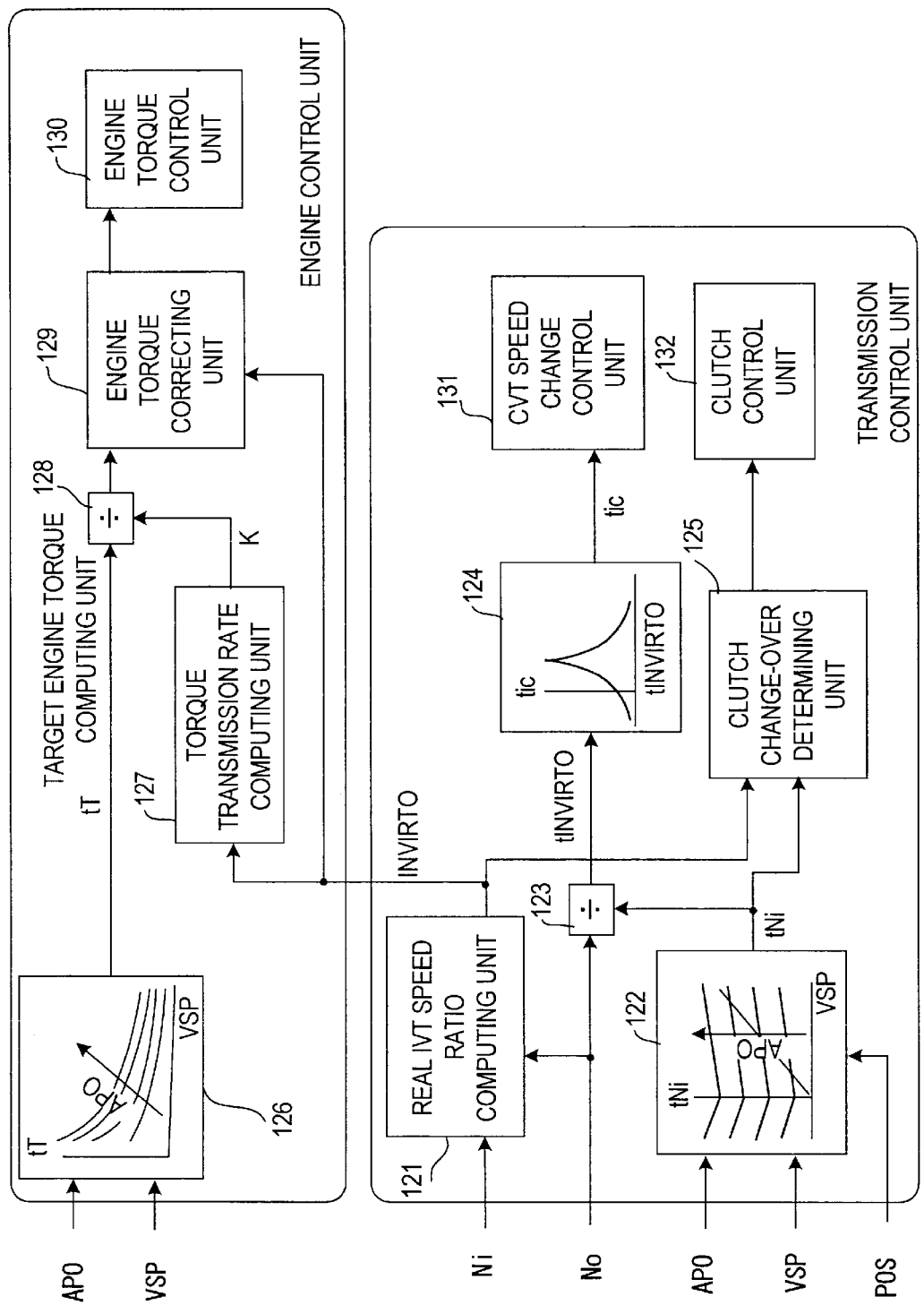
FIG. 3 is a block diagram showing the control performed by a controller of the input torque limiting device according to a first embodiment of the present invention.
Figure 4:
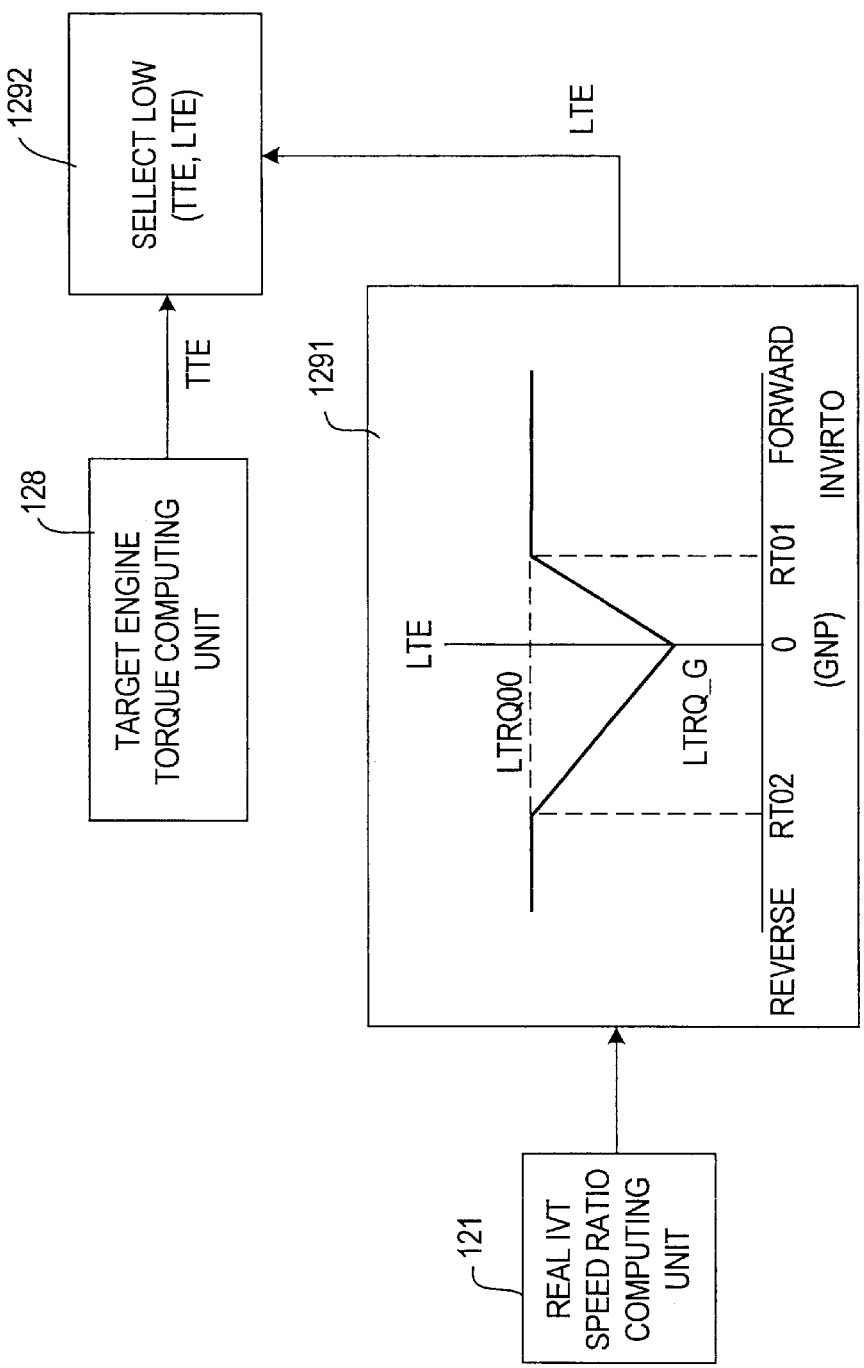
FIG. 4 is a block diagram showing the control performed by an engine torque correction unit of FIG. 3.

To perform this control process, the controller 80 comprises process units shown in FIG. 3 and FIG. 4. These units are virtual units constructed from the functions of the above CPU, ROM and RAM.

In a transmission control unit which is shown in lower part of FIG. 3, a target input rotation speed computing unit 122 determines a target input rotation speed tNi of the input shaft 1a. The unit 122 computes a target input rotation speed tNi of the input shaft 1a based on a first map which is preset and stored in the ROM, according to the direction of travel corresponding to the selector position POS of the shift lever, vehicle speed VSP and the detected accelerator pedal depression amount APO.

The ratio of an output rotation speed No of the final output shaft and the target input rotation speed tNi is computed as a target IVT output/input speed ratio tINVIRTO in the target IVT speed ratio computing unit 123 (tINVIRTO=No/tNi). The target IVT output/input speed ratio is equal to the inverse of the target IVT ratio tii (tii=tNi/No).

In a target CVT ratio computing unit 124, to achieve the target IVT output/input speed ratio calculated by a target IVT speed ratio computing unit 123, a target CVT ratio tic of the CVT 2 is computed by a second map which is preset and stored in the ROM. This second map determines the relation between the target IVT output/input speed ratio tINVIRTO and target CVT ratio tic.

In the CVT speed change control unit 131, the step motor 36 is driven after converting this target CVT ratio tic to a step number, and feedback control of CVT ratio ic is performed.

Next, in a real IVT speed ratio computing unit 121, the real IVT ratio ii is computed from the ratio of the present input rotation speed Ni and an output rotation speed No of the final output shaft 6 (ii=Ni/No). The inverse of this is calculated as the real IVT output/input speed ratio INVIRTO (INVIRTO=No/Ni).

In a clutch change-over determining unit 125, the need to change over between the power circulation mode clutch 9 and direct mode clutch 10 is determined by comparing this real IVT output/input speed ratio INVIRTO with the target IVT output/input speed ratio tINVIRTO. When it is necessary to make a change-over, the aforesaid power circulation mode clutch actuator 91 and direct mode clutch actuator 92 are commanded to change their drive states and the engaging state of both clutches is changed, by a clutch control unit 132.

On the other hand, in an engine control unit (which is shown in upper part of FIG. 3), a target drive torque computing unit 126 computes a target drive torque tT from a third map which is preset and stored in the ROM, according to the accelerator pedal depression amount APO and vehicle speed VSP.

Next, in a target engine torque computing unit 128, a target engine torque TTE of the engine 50 is computed by dividing the target drive torque tT by a torque amplification factor K determined according to the IVT output/input speed ratio INVIRTO.

Here, the torque amplification factor K of the IVT 30 is computed by a torque transmission rate computing unit 127 according to the real IVT output/input speed ratio INVIRTO, based on the fourth map (not shown) which is preset and stored in the ROM.

Next, in an engine torque correcting unit 129, a torque correction is performed as described later according to the real IVT output/input speed ratio INVIRTO relative to the target engine torque TTE calculated by the target engine torque computing unit 128. This is in order to prevent an excessive torque from acting on the CVT 2.

In the engine torque control unit 130, the fuel injection amount and ignition timing are determined, and the throttle actuator 93 is driven so as to obtain the final target engine torque fTTE which is the target engine torque TTE corrected by the engine torque correcting unit 129.

Next, the engine torque correcting unit 129 which prevents excessive torque from acting on the CVT 2 will be described referring to FIG. 4.

The engine torque correcting unit 129 comprises an input torque limit computing unit 1291 and an engine torque limiting unit 1292. The input torque limit computing unit 1291 sets an input torque limit LTE of the IVT 30 according to the real IVT output/input speed ratio INVIRTO. Here, the input torque limit is the maximum torque which can be input to the IVT 30. The engine torque limiting unit 1292 selects the lesser of the input torque limit LTE and the target engine torque TTE from the target engine torque computing unit 128.

The input torque limit computing unit 1291 computes the input torque limit LTE of the IVT 30 according to the IVT output/input speed ratio INVIRTO.

The input torque limit LTE is computed based on the fifth map stored in the ROM. The fifth map preset the relation between the IVT output/input speed ratio INVIRTO and the input torque limit LTE. The input torque limit LTE may be given as a function of the IVT output/input speed ratio INVIRTO.

In the fifth map, when the IVT output/input speed ratio INVIRTO is 0 (i.e., when the IVT ratio ii is infinite), the input torque limit LTE is set to a minimum torque LTRQ_G. The minimum torque LTRQ_G is set taking account of the strength and durability of the parts of CVT such as power rollers.

At the geared neutral point GNP, the largest torque is input to the parts of the CVT 2, so the engine torque of the geared neutral point GNP is limited to be smaller than the engine torque at another IVT output/input speed ratio INVIRTO.

When the IVT output/input speed ratio INVIRTO is within the range RTO2≦INVIRTO≦RTO1, the input torque limit LTE varies according to the IVT output/input speed ratio INVIRTO. In other words, within the predetermined range RTO2≦INVIRTO≦RTO1 comprising the case where the IVT output/input speed ratio INVIRTO is 0, the input torque limit LTE increases according to the increase of the absolute value of the IVT output/input speed ratio INVIRTO. RTO1 is a first predetermined IVT output/input speed ratio on the forward side, and RTO2 is a second predetermined IVT output/input speed ratio on the reverse side.

However, at an IVT output/input speed ratio INVIRTO outside this range, the input torque limit LTE is set to a constant torque (LTRQ00). Thus, when the absolute value of the IVT output/input speed ratio INVIRTO is very large (INVVIRTO>RTO1) or when the vehicle is reversing (INVIRTO<RTO2), the input torque limit LTE of the IVT 30 is limited to the constant torque LTRQ00 regardless of the IVT output/input speed ratio INVVIRTO. The values of RTO1, RTO2 and LTRQ00 are determined, taking account of the durability of the CVT and the demanded acceleration performance of the vehicle.

Thus, after the vehicle has started from the geared neutral point GNP due to an acceleration operation, a larger engine torque can be supplied according to the variation of the IVT output/input speed ratio INVIRTO than at GNP, to the extent that the durability and performance of the CVT 2 is not impaired.

When the torque of the engine 50 is extremely large, there is a risk that the durability and performance of the torque transmission parts of the CVT 2 may decline regardless of the IVT output/input speed ratio INVIRTO. However, according to this invention, the input torque is limited to the input torque value (LTRQ00) which is a stringent requirement for the CVT 2, regardless of the magnitude of the IVT output/input speed ratio INVIRTO, and not only in the vicinity of the geared neutral point GNP. Consequently, maximum acceleration performance can be obtained which does not adversely affect the durability and performance of the CVT 2 regardless of the IVT output/input speed ratio INVIRTO.

Further, the relation between the first predetermined IVT output/input speed ratio RTO1 and second predetermined IVT output/input speed ratio RTO2, which determines the variation of the input torque limit LTE according to the IVT output/input speed ratio INVIRTO, is set to: |RTO1|<|RTO2|.

Hence, the input torque limit LTE for reverse motion and the input torque limit LTE for forward motion are set to different values in the vicinity of the geared neutral point GNP.

Between reverse motion and forward motion, the CVT ratio ic of the CVT 2 built into the IVT 30 is different even if the absolute values of the input rotation speed Ni and output rotation speed No are the same, and the maximum torque which can be input to the CVT 2 is slightly different. In the present embodiment, when the vehicle starts, regardless of whether it is reversing or moving forwards, the final target engine torque fTTE can be obtained which does not adversely affect acceleration performance in any way while the CVT 2 is protected from an excessive input torque.

The engine torque limiting unit 1292 selects the smaller of the uncorrected target engine torque TTE and input torque limit LTE as the final target engine torque.

Hence, the maximum torque which can be output by the engine 50, i.e., the maximum input torque of the IVT 30, is set so as not to exceed the input torque limit LTE of the IVT 30. Specifically, the torque limiting value LTE input to the IVT 30 is computed according to the IVT output/input speed ratio INVIRTO, and the output torque of the engine 50 is limited so that the real engine torque is less than the input torque limit LTE.

Figure 5:
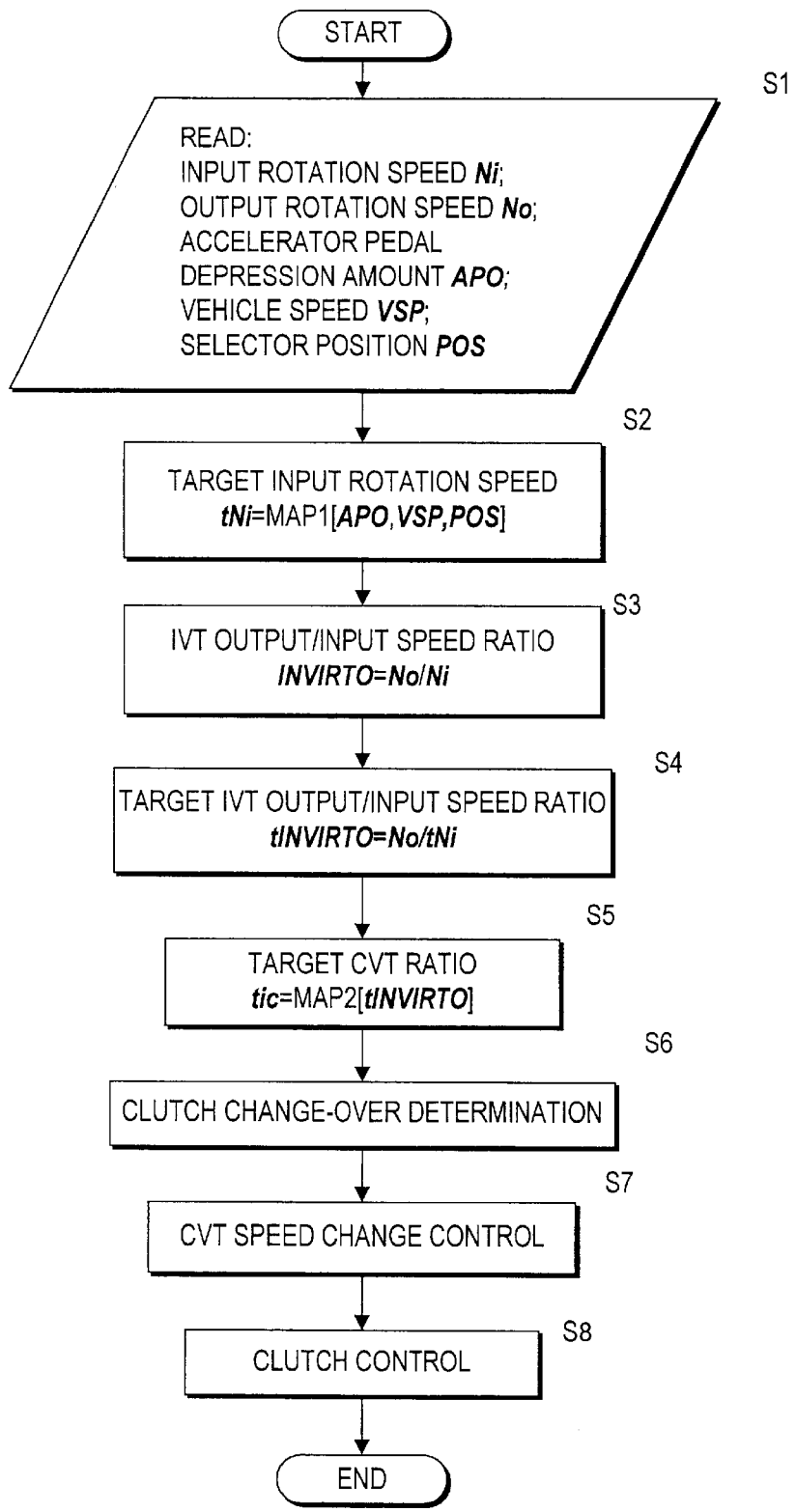
FIG. 5 is a flowchart describing the transmission control performed by the controller according to the first embodiment of the present invention.

In this way, an engine torque not exceeding the input torque limit LTE is always input to the input shaft 1a of the IVT 30 according to the IVT output/input speed ratio INVIRTO, whatever the IVT output/input speed ratio INVIRTO at which the vehicle is running may be. Next, a control program relating to the transmission control according to the first embodiment of the present invention will be described with reference to flowcharts shown in FIG. 5. This control program is performed by the controller 80, and is repeated at an interval of 10 milliseconds by a timer interrupt or the like.

When the program starts, in a step S1, the input rotation speed Ni, output rotation speed No, accelerator pedal depression amount APO, vehicle speed VSP, and selector position POS are detected. Next, in a step S2, the target input rotation speed tNi is computed from the accelerator pedal depression amount APO, vehicle speed VSP, and selector position POS, based on the first map as shown by the target input rotation speed computing unit 122 of FIG. 3.

The program proceeds to a step S3. In the step S3, a real IVT output/input speed ratio INVIRTO is computed by dividing the output rotation speed No by the input rotation speed Ni. In a step S4, a target IVT output/input speed ratio tINVIRTO is computed by dividing the output rotation speed No by the target input rotation speed tNi. Next, in a step S5, a target CVT ratio tic of the CVT 2 is computed from the IVT output/input speed ratio, based on a second map as shown by the target CVT ratio computing unit 124 of FIG. 3.

The program further proceeds to a step S6. In the step S6, the need to change over between the power circulation mode clutch 9 and direct mode clutch 10 is determined by comparing this real IVT output/input speed ratio INVIRTO with the target IVT output/input speed ratio tINVIRTO. Next, in a step S7, a control command to achieve the target CVT ratio tic is sent to the step motor 36. In a step S8, a command relating to clutch change-over is output to the power circulation mode clutch actuator 91 and direct mode clutch actuator 92. Subsequently, the program is terminated.

Figure 6:
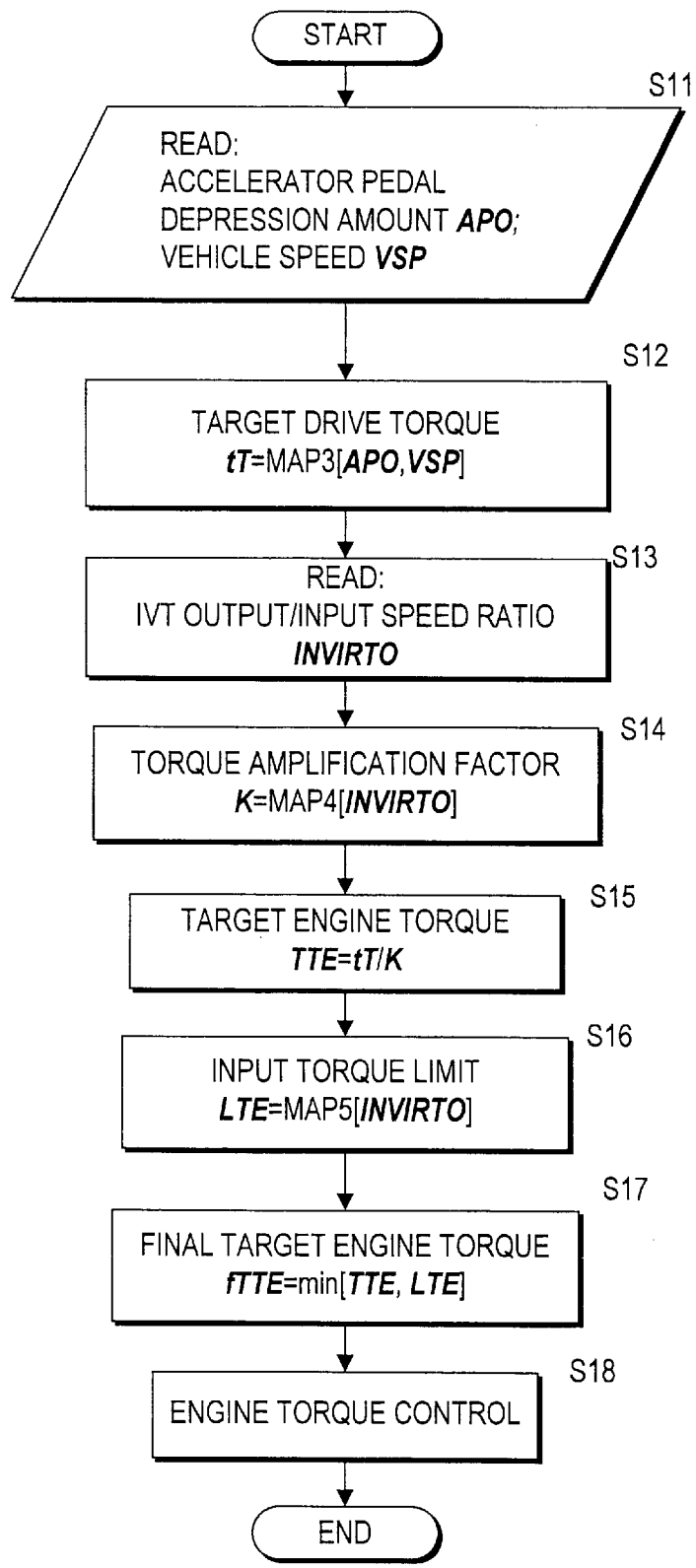
FIG. 6 is a flowchart describing the engine control performed by the controller according to the first embodiment of the present invention.

Next, the a control program relating to the engine control according to the first embodiment of the present invention will be described with reference to a flowchart shown in FIG. 6. The control program is executed at a specified time interval (for example 10 milliseconds) during the running of the vehicle.

When the program starts, in a step S11, the accelerator pedal depression amount APO and vehicle speed VSP are detected. Then, in a step S12, the target drive torque tT is computed based on the third map as shown by the drive torque computing unit 126 of FIG. 3, according to the accelerator pedal depression amount APO and vehicle speed VSP. Next, in a step S13, the IVT output/input speed ratio INVIRTO is detected which has been already calculated in the step S3 of FIG. 5. In a step S14, the torque amplification factor K is computed according to the real IVT output/input speed ratio Then, the program proceeds to a step S15, where a target engine torque TTE of the engine 50 is computed by dividing the target drive torque tT by the torque amplification factor K. Next, in a step S16, the input torque limit LTE is computed according to the IVT output/input speed ratio INVIRTO, based on the fifth map as shown by the input torque limit computing unit 1291.

In a step S17, the lesser of the input torque limit LTE and the target engine torque TTE is selected as the final target engine torque fTTE. Then, in a step S18, commands to control the engine torque are sent to the throttle actuator 93, fuel injection device 94 or ignition device 95 based on the final target engine torque fTTE. Subsequently, the program is terminated.

Figure 7:
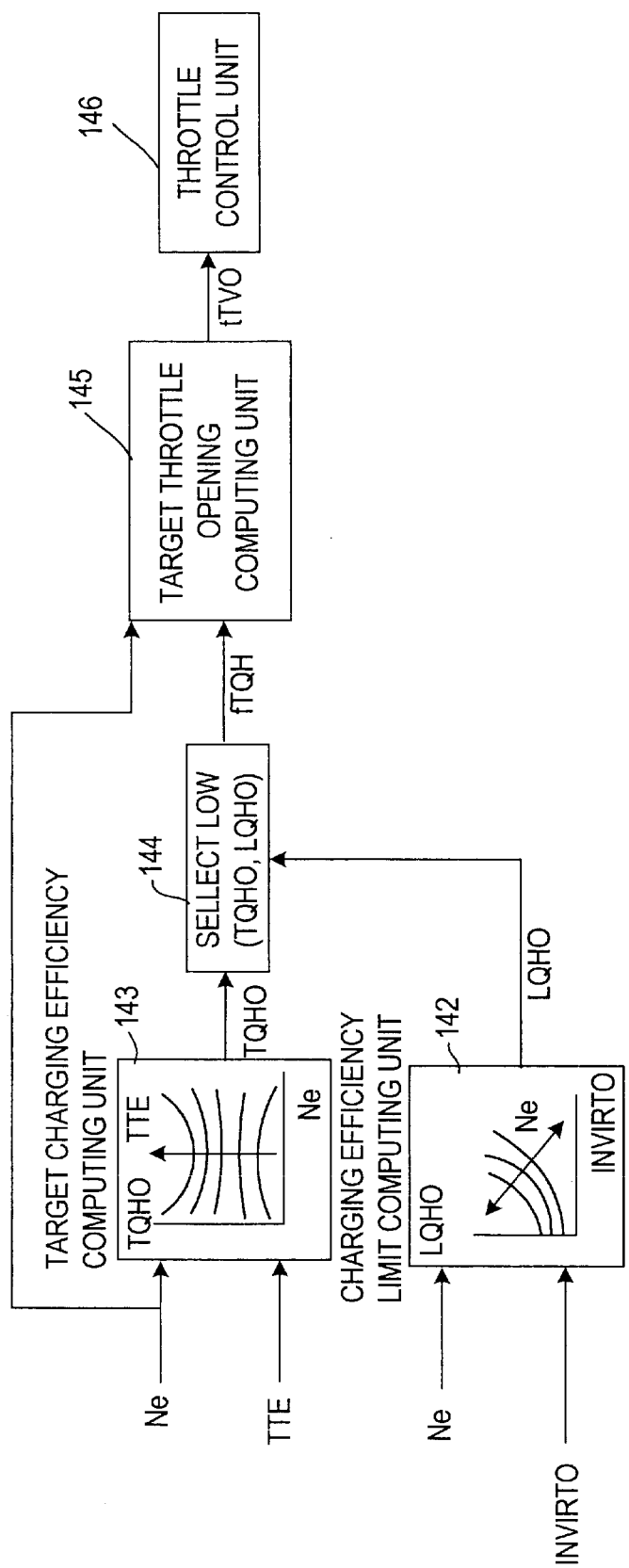
FIG. 7 is a block diagram describing an engine torque control according to a second embodiment.

A second embodiment relating to the present invention will now be described referring to FIG. 7. The second embodiment is the case where the engine torque is controlled by operating throttle valve. The functions of the engine torque correcting unit 129 and engine torque control unit 130 of FIG. 3 and FIG. 4 are replaced by functions to control the output torque of the engine 50 by driving the throttle actuator 93 according to a target throttle opening tTVO.

First, in a target charging efficiency computing unit 143, a target charging efficiency TQHO which is the filling efficiency of the air taken into the cylinder required to realize the target output torque of the engine 50, is computed as a percentage using a sixth map which is preset and stored in the ROM. Here, the computation is performed based on the engine rotation speed Ne (or input rotation speed Ni) from the input shaft rotation speed sensor 81, and the target engine torque TTE from the target engine torque computing unit 128.

On the other hand, in a charging efficiency limit computing unit 142, the charging efficiency limit LQHO which is a limit of the charging efficiency for each cylinder of the engine corresponding to the input torque limit LTE (i.e. the output limit torque value of the engine 50), is computed. This computation is performed from a seventh map which is preset and stored in the ROM, based on the engine rotation speed Ne, and IVT output/input speed ratio INVIRTO calculated in the real IVT speed ratio computing unit 121.

In the seventh map, at the geared neutral point GNP where the IVT output/input speed ratio INVIRTO is 0, the charging efficiency limit LQHO is set to be a minimum. Hence, the drive force necessary to start the vehicle can be obtained while an excess torque is prevented from being input to the IVT 30 in the vicinity of the geared neutral point GNP. In the engine torque limiting unit 144, the smaller of the charging efficiency limit LQHO computed by the charging efficiency limit computing unit 142, and the target charging efficiency TQHO computed by the target charging efficiency computing unit 143, is selected as a final target charging efficiency fTQH.

In a target throttle opening computing unit 145, a throttle opening TVO required to achieve the final target charging efficiency fTQH is computed using an eighth map, not shown. Here, the target throttle opening tTVO is computed based on the final target charging efficiency fTQH and the engine rotation speed Ne. In the throttle control unit 146, the throttle actuator 93 is commanded to realize the computed target throttle opening tTVO.

Figure 8:
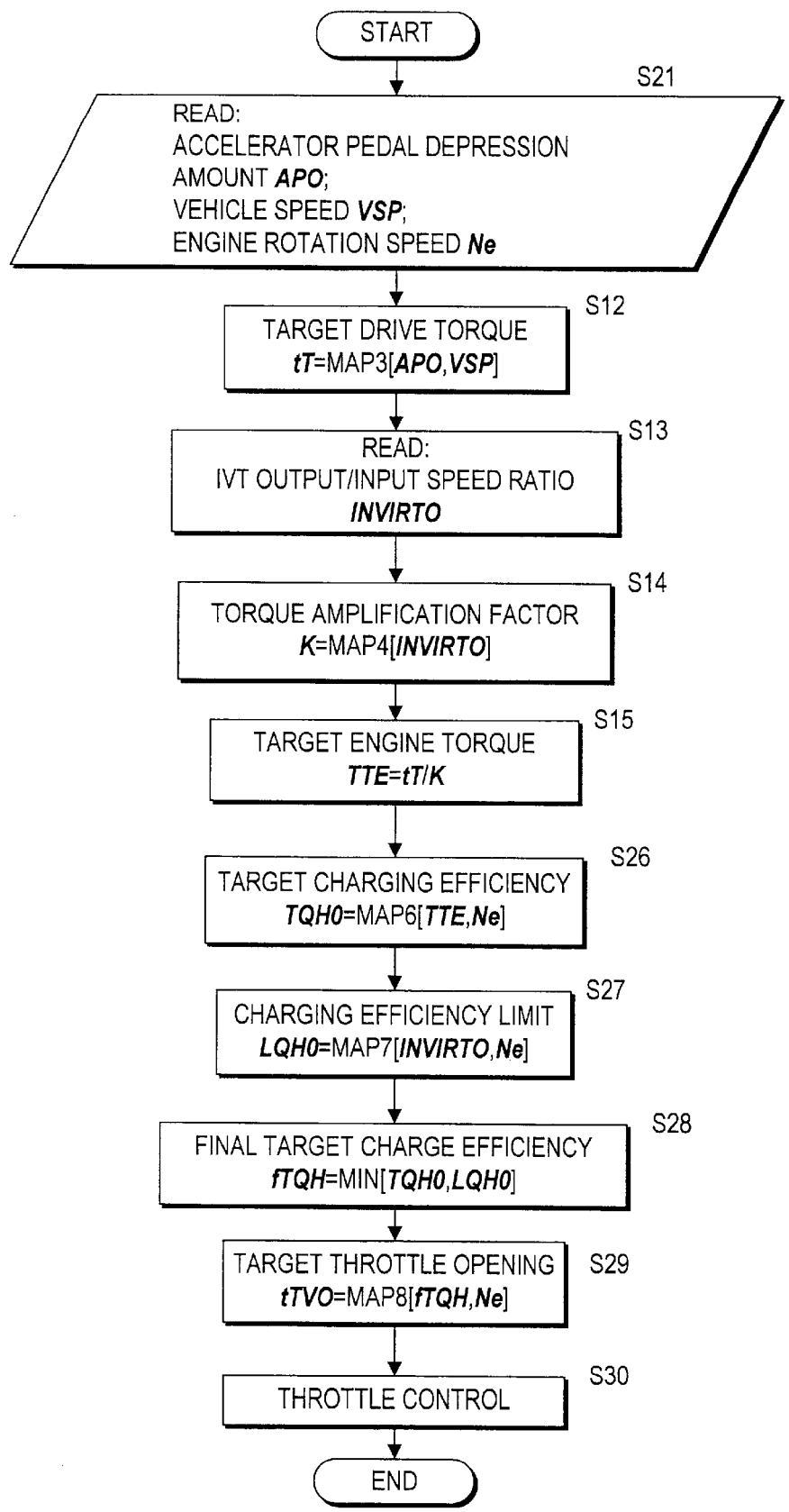
FIG. 8 is a flowchart describing the control routine performed by the controller according to the second embodiment of the present invention.

Next, a control program relating to the engine control according to the second embodiment of the present invention shown in the block diagram of FIG. 7 will be described referring to the flowchart of FIG. 8. This control program is performed by the controller 80, and is repeated at an interval of 10 milliseconds by a timer interrupt or the like.

In the second embodiment, the step S11 and the steps S16–S18 of the flowchart according to the first embodiment are replaced by the step S21 and the steps S26–S29, respectively.

When the program starts, in a step S21, the accelerator pedal depression amount APO, vehicle speed VSP, and engine rotation speed Ne are detected. Hereinafter, the steps S12–S15 are executed in the same manner as the flowchart shown in FIG. 6.

Then, the program goes to a step S26 where the target charging efficiency TQHO is computed from the target engine torque TTE and engine rotation speed Ne, based on the sixth map as shown by the target charging efficiency computing unit 143. The step S26 is a step performed in the target charging efficiency computing unit 143. Next, in a step S27, the charging efficiency limit LQHO is computed from the engine rotation speed Ne, and IVT output/input speed ratio INVIRTO, based on the seventh map as shown by the charging efficiency limit computing unit 142.

The program proceeds to a step S28 where the smaller of the charging efficiency limit LQHO and the target charging efficiency TQHO is selected as a final target charging efficiency fTQH. Next, in a step S29, a target throttle opening tTVO required to achieve the final target charging efficiency fTQH is computed using the eighth map.

Then, in the step S30, a command to realize the target throttle opening tTVO is sent to the throttle actuator 93. Subsequently, the program is terminated.

Figure 9:
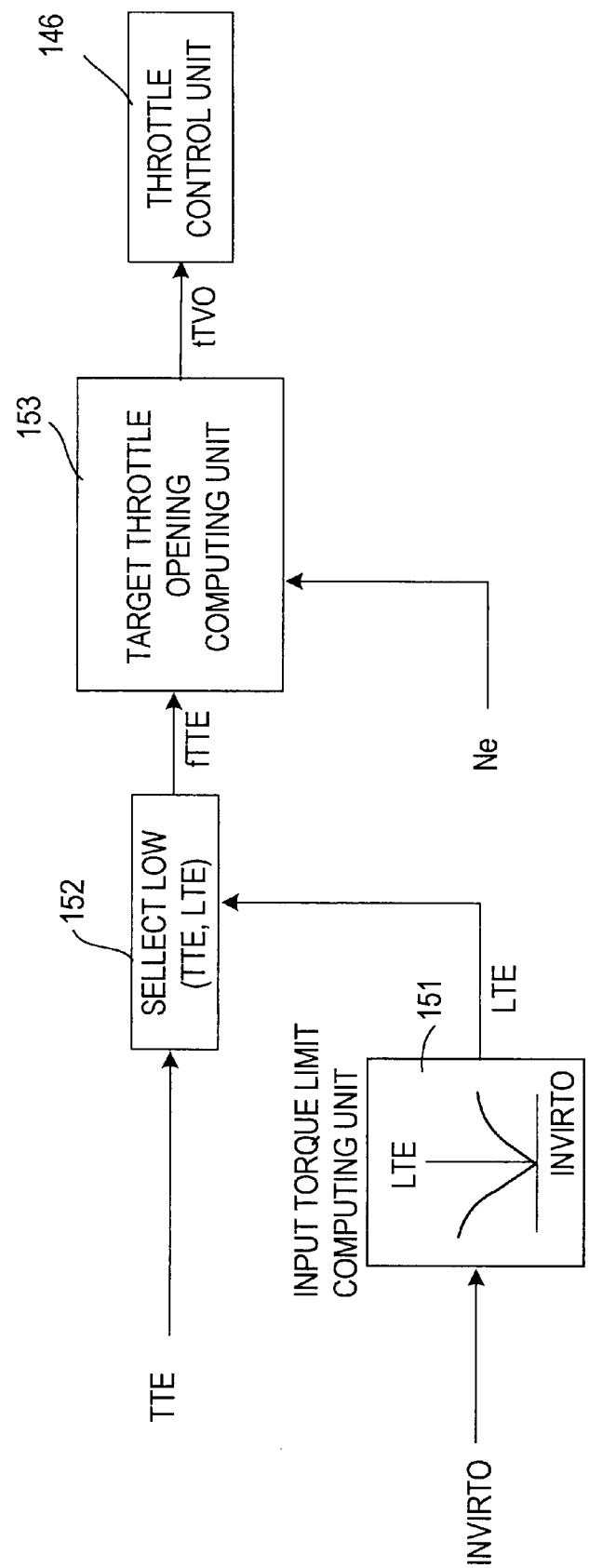
FIG. 9 is a block diagram describing an engine torque control according to a third embodiment.

A third embodiment will now be described referring to FIG. 9. The third embodiment is also the case where the engine torque is controlled by operating throttle valve. In this embodiment, the functions of the engine torque correcting unit 129 and engine torque control unit 130 of FIG. 3 and FIG. 4 are replaced by a function to control the output torque of the engine 50 by driving the throttle actuator 93 based on the target throttle opening tTVO.

First, in a input torque limit computing unit 151, the input torque limit LTE is computed from a ninth map which is preset and stored in the ROM based on the IVT output/input speed ratio INVIRTO from the aforesaid real IVT speed ratio computing unit 121.

In this unit 151, when the IVT output/input speed ratio INVIRTO is 0, the input torque limit LTE is a minimum, and the input torque limit LTE is set to increase as the magnitude of the IVT output/input speed ratio INVIRTO increases. Therefore, the drive force required to start the vehicle is ensured while an excessive torque is prevented from being input to the IVT 30 in the vicinity of the geared neutral point GNP.

Next, in an engine torque limiting unit 152, the smaller of the target engine torque TTE from the target engine torque computing unit 128 of FIG. 3 and the input torque limit LTE from the aforesaid input torque limit computing unit 151, is selected as the final target engine torque fTTE.

In the target throttle opening computing unit 153, the target throttle opening tTVO is computed by looking up a tenth map (not shown) which is preset and stored in the ROM, based on the final target engine torque fTTE and engine rotation speed Ne. Subsequently, in the throttle control unit 146, the throttle actuator 93 is commanded to realize the computed target throttle opening tTVO.

Figure 10:
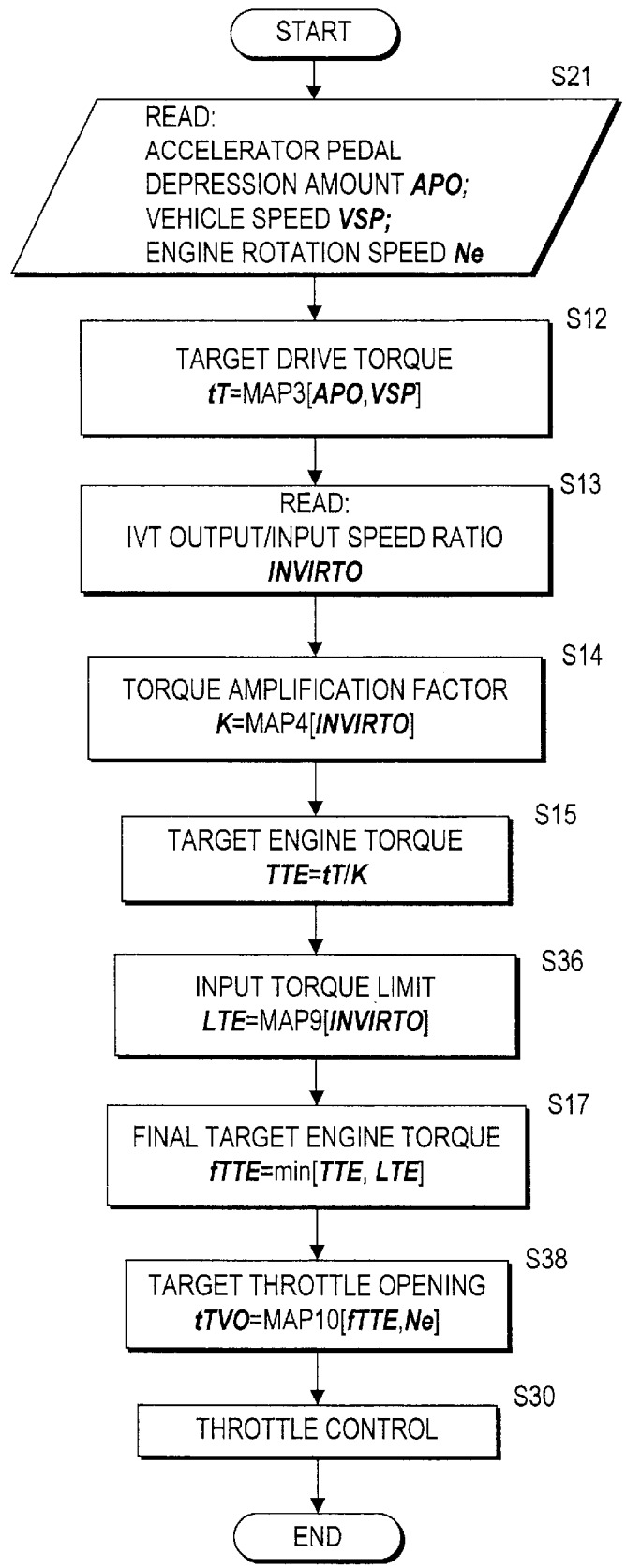
FIG. 10 is a flowchart describing control routine performed by the controller according to the third embodiment of the present invention.

Next, a control program relating to the engine control according to the third embodiment of the present invention shown in the block diagram of FIG. 9 will be described referring to the flowchart of FIG. 10. This control program is performed by the controller 80, and is repeated at an interval of 10 milliseconds by a timer interrupt or the like.

The third embodiment is also the case where the engine torque is controlled by operating throttle valve. The steps S12–S15 are executed in the same manner as the flowchart shown in FIG. 6. Next, in a step S36, the input torque limit LTE is computed from the IVT output/input speed ratio INVIRTO, based on the ninth map as shown by the input torque limit computing unit 151. Then, the step S17 is executed in the same manner as the flowchart shown in FIG. 6.

The program further proceeds to a step S38 where the target throttle opening tTVO is computed by looking up the tenth map (not shown), based on the final target engine torque fTTE and engine rotation speed Ne. Subsequently, the step S30 is executed in the same manner as the flowchart shown in FIG. 8.

Figure 11:
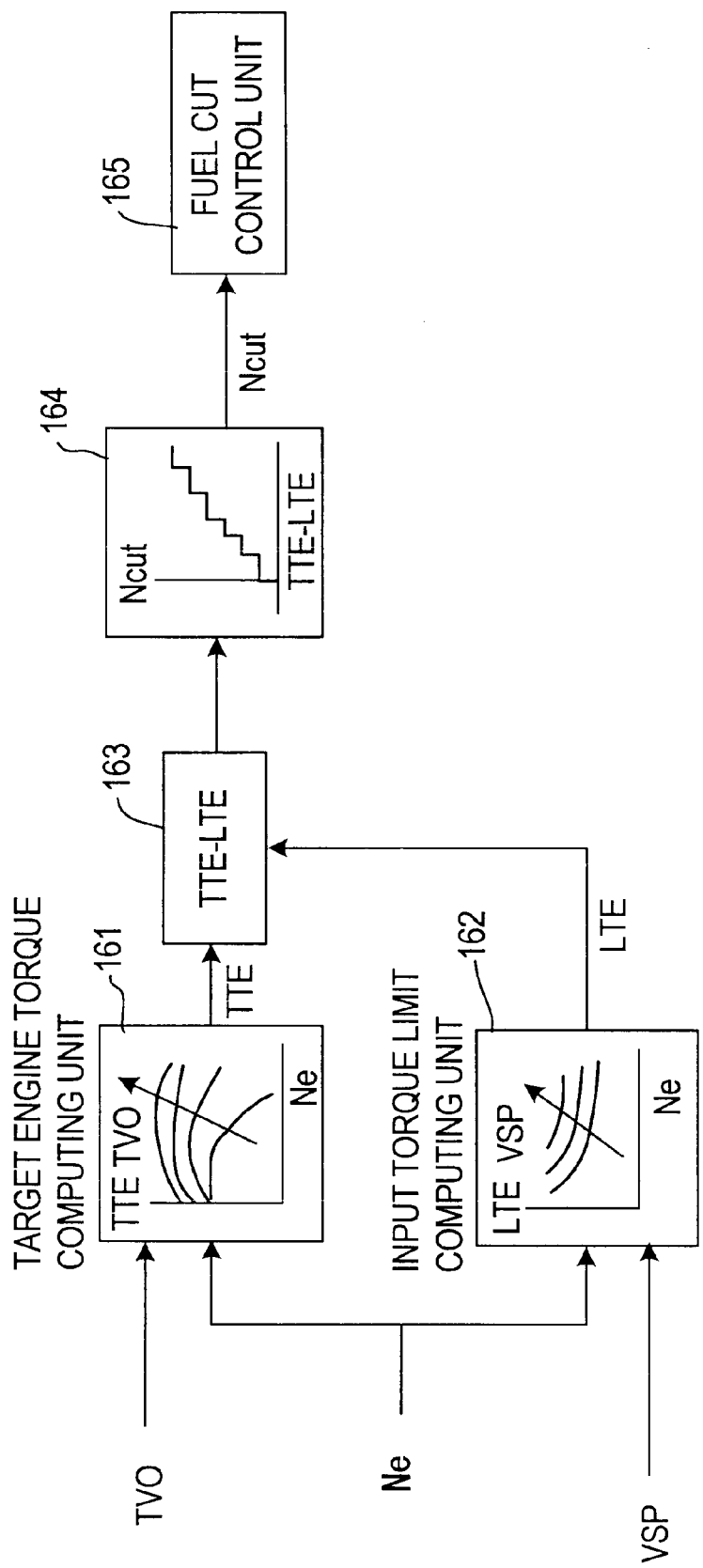
FIG. 11 is a block diagram describing an engine torque control according to a fourth embodiment.

A fourth embodiment will now be described referring to FIG. 11. The fourth embodiment is the case where the engine torque is controlled by cutting off the fuel supply to cylinders of the engine.

In this embodiment, the functions of the engine torque correcting unit 129 and engine torque control unit 130 of FIG. 3 in FIG. 4 are replaced by a function to control the output of the engine 50 by fuel cut.

First, in a target engine torque computing unit 161, the target engine torque TTE of the engine 50 is estimated and computed by looking up an eleventh map which is preset and stored in the ROM from the throttle opening TVO (or accelerator pedal depression amount APO) and engine rotation speed Ne.

On the other hand, in the input torque limit computing unit 162, the input torque limit LTE is computed using a twelfth map preset and stored in the ROM, from the engine rotation speed Ne and vehicle speed VSP. The output rotation speed No and vehicle speed VSP are in a directly proportional relationship, so the relation between the engine rotation speed Ne and vehicle speed VSP is equivalent to the relation between the input rotation speed Ni and output rotation speed No of the IVT 30. Accordingly, the IVT output/input speed ratio INVIRTO is directly proportional to the ratio of the engine rotation speed Ne and vehicle speed VSP (=VSP/Ne). Therefore, the twelfth map is a map which minimizes the input torque limit LTE when the vehicle speed VSP=0 and the engine rotation speed Ne is an idle rotation speed.

The input torque limit computing unit 162 computes the input torque limit LTE according to the vehicle speed VSP and engine rotation speed Ne. Therefore, the input torque can be controlled to within the input torque limit LTE by the control device of the engine 50 alone even when the IVT output/input speed ratio INVIRTO or IVT ratio ii is unknown. Thus the IVT 30 can be protected even when there are signal abnormalities or the like.

Next, in a torque deviation computing unit 163, the deviation D (=TTE−LTE) of the target engine torque TTE calculated by the target engine torque computing unit 161 and the input torque limit LTE calculated by the input torque limit computing unit 162, is computed.

Next, in a cut-off cylinder number computing unit 164, a number of cylinders Ncut in which fuel cut is performed is computed from a thirteenth map which is preset and stored in the ROM, according to the deviation (TTE–LTE) of engine torque. In the thirteenth map, the number of cylinders Ncut in which fuel cut is performed increases, the larger the engine torque TTE which is actually estimated to be output compared to the input torque limit LTE.

In a fuel cut control unit 165, fuel cut is performed in the number of cylinders Ncut calculated by the cut-off cylinder number computing unit 164, and thus the engine torque is limited so as not to exceed the input torque limit LTE. By limiting the engine torque in this way, input of an excessive torque to the CVT 2 is prevented.

Next, a control program relating to the engine control according to the fourth embodiment of the present invention shown in the block diagram of FIG. 11 will be described referring to the flowchart of FIG. 12. This control program is performed by the controller 80, and is repeated at an interval of 10 milliseconds by a timer interrupt or the like.

When the program starts, in a step S41, the engine rotation speed Ne, throttle opening TVO, and vehicle speed VSP are detected. Next, in a step S42, the target engine torque TTE of the engine 50 is computed by looking up the eleventh map as shown by the target engine torque computing unit 161, according to the throttle opening TVO (or accelerator pedal depression amount APO) and engine rotation speed Ne.

The program further proceeds to a step S43 where the input torque limit LTE is computed from the engine rotation speed Ne and vehicle speed VSP using the twelfth map as shown by the input torque limit computing unit 162. Next, in a step S44, the deviation D(=TTE–LTE) of the target engine torque TTE and the input torque limit LTE is computed.

The program further goes to a step S45 where a number of cylinders Ncut in which fuel is cut-off is computed according to the deviation (TTE–LTE) of engine torque, based on the thirteenth map as shown by the cut-off cylinder number computing unit 164. Next, in a step S46, the fuel injection device 94 is commanded to perform fuel-cut in the number of cylinders Ncut.

Figure 13:
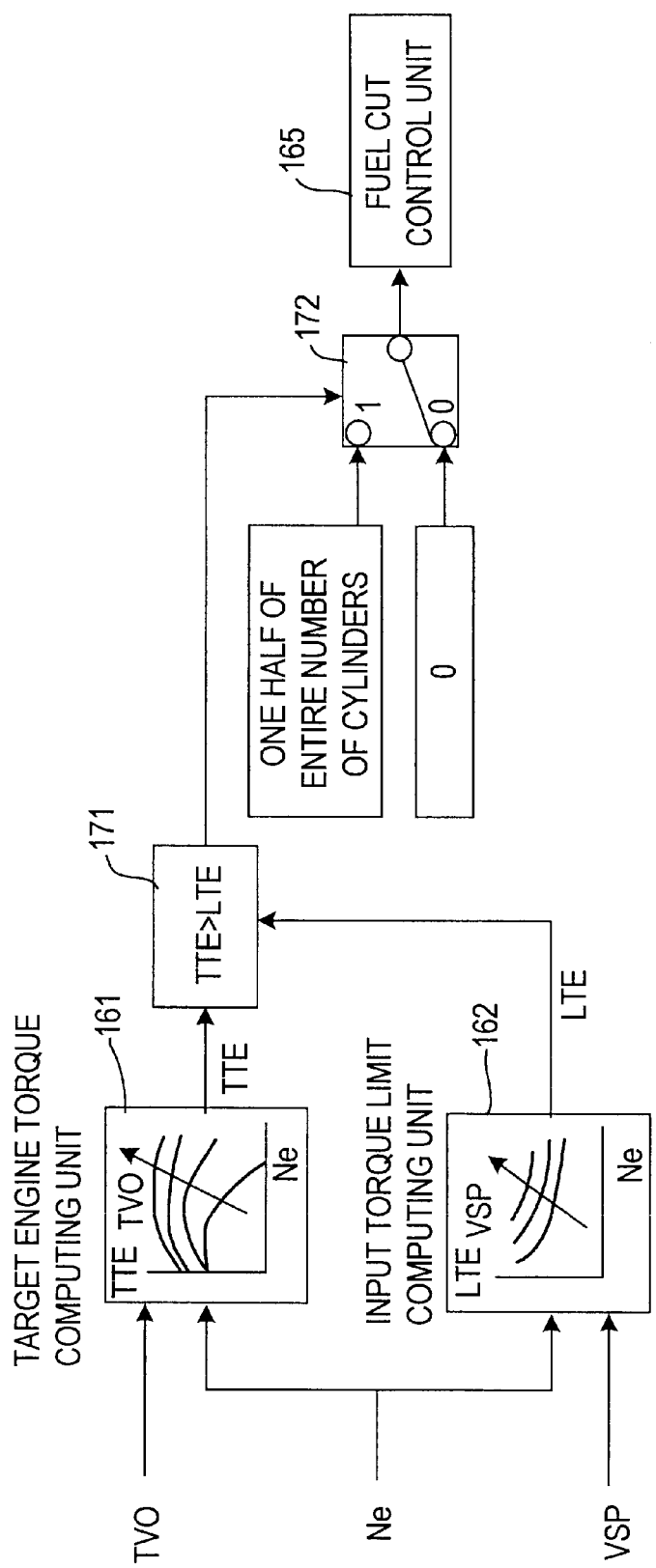
FIG. 13 is a block diagram describing an engine torque control according to a fifth embodiment.

A fifth embodiment will now be described referring to the block diagram of FIG. 13. In this embodiment, the torque deviation computing unit 163 and cut-off cylinder number computing unit 164 of FIG. 11 are replaced by a torque deviation determining unit 171 and fuel cut cylinder number computing unit 172. This embodiment is an embodiment for the case where the cylinder fuel cut of the fourth embodiment is applied to an engine wherein fuel is injected to plural cylinders in groups.

In the target engine torque computing unit 161, as in the case of the fourth embodiment, the engine torque TTE of the engine 50 is computed.

On the other hand, in the input torque limit computing unit 162, as in the case of the fourth embodiment, the input torque limit LTE is computed.

In the torque deviation determining unit 171, it is determined whether or not the target engine torque TTE calculated by the target engine torque computing 161 is larger than the input torque limit LTE calculated by the input torque limit computing unit 162.

In the fuel cut cylinder number computing unit 172, when the target engine torque TTE is larger than the input torque limit LTE, a number of cylinders Ncut in which fuel cut is performed is set to one half of the entire number of cylinders. If, on the other hand, this is not the case, the number of cylinders in which fuel cut is performed is set to 0.

In the fuel cut control unit 165, fuel cut is performed in the number of cylinders Ncut set by the fuel cut cylinder number computing unit 172, and the engine torque is limited not to exceed the input torque limit LTE.

Therefore, if the target engine torque TTE actually estimated to be output is larger than the input torque limit LTE calculated by the input torque limit computing unit 162, fuel cut is performed in one half of the entire number of cylinders so as to limit the engine torque. In this way, input of an excessive torque to the CVT 2 is prevented.

Figure 14:
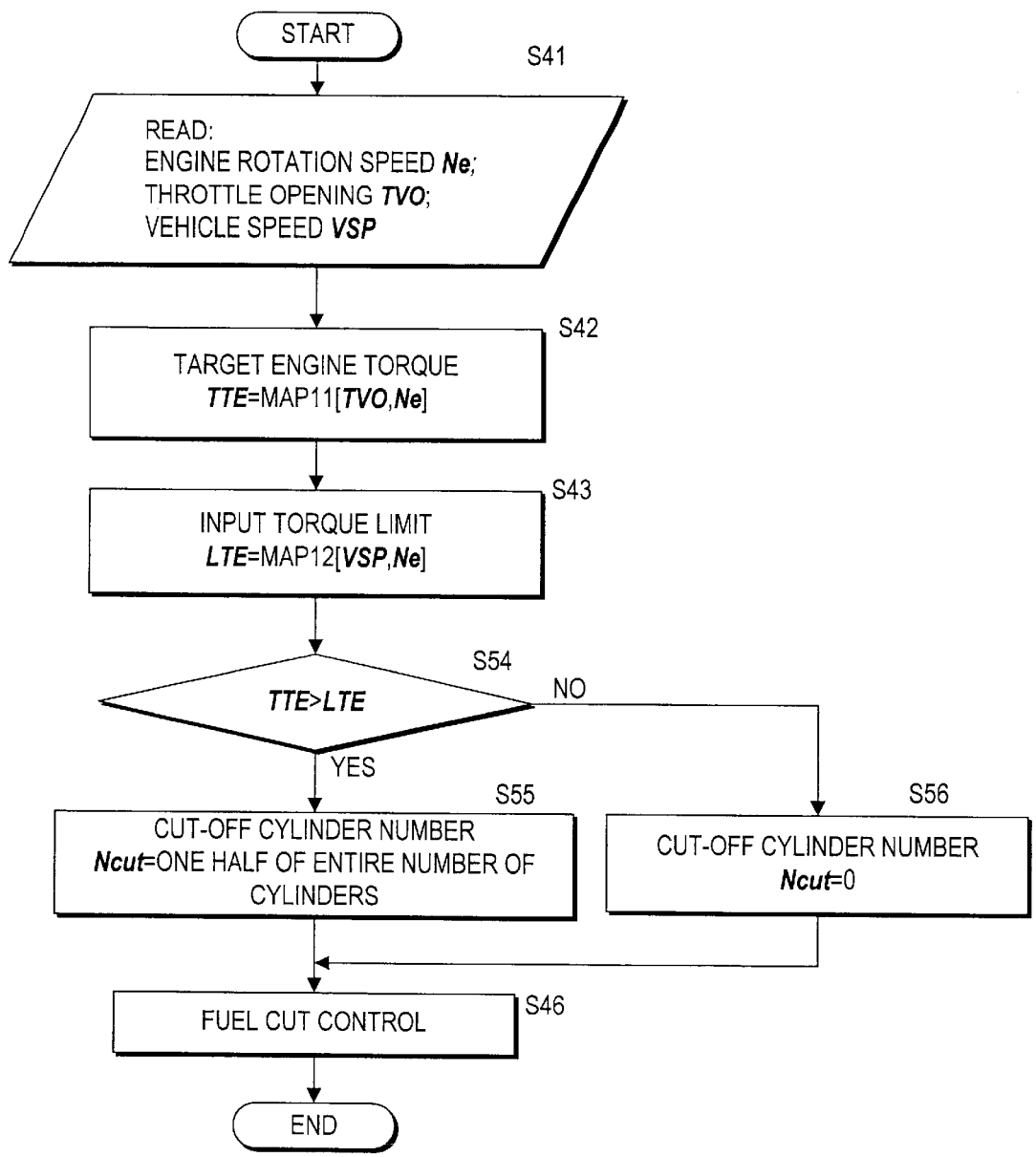
FIG. 14 is a flowchart describing the control routine performed by the controller according to the fifth embodiment of the present invention.

Next, a control program relating to the engine control according to the fifth embodiment of the present invention shown in the block diagram of FIG. 13 will be described referring to the flowchart of FIG. 14. This control program is performed by the controller 80, and is repeated at an interval of 10 milliseconds by a timer interrupt or the like.

Figure 12:
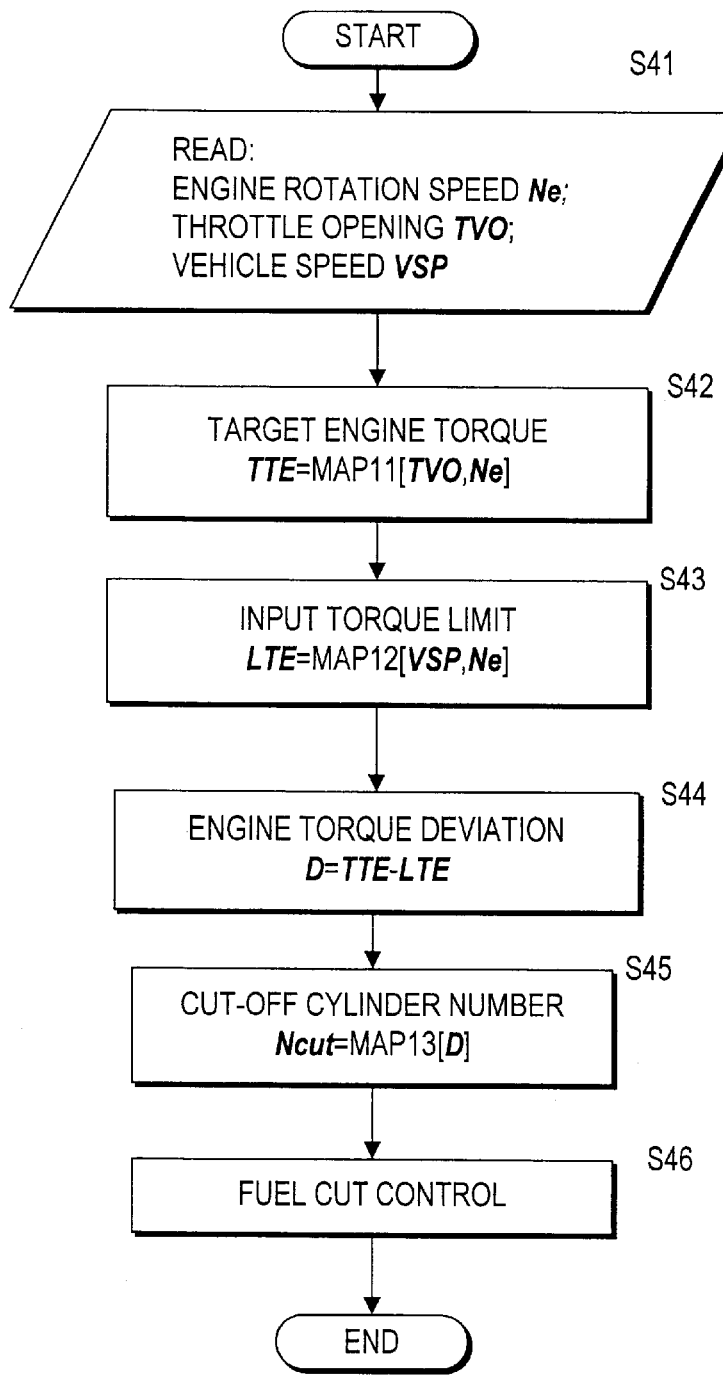
FIG. 12 is a flowchart describing the control routine performed by the controller according to the fourth embodiment of the present invention.

First, the steps S41–S43 are executed in the same manner as the flowchart shown in FIG. 12.

Next, in a step S54, it is determined whether or not the target engine torque TTE is larger than the input torque limit LTE. When the target engine torque TTE is larger than the input torque limit LTE, the program proceeds to a step S55 where the number of cylinders Ncut in which fuel cut is performed is set to one half of the entire number of cylinders. On the other hand, when this is not the case, in a step S56, the number of cylinders Ncut in which fuel cut is performed is set to 0.

Subsequently, in a step S46, fuel-cut is performed in the set number of cylinders, and the engine torque is limited so as not to exceed the input torque limit LTE.

The entire contents of Japanese Patent Applications P2000-208590 (filed Jul. 10, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An input torque limiting device for an infinitely variable transmission connected to an engine of a vehicle, into which the torque from the engine is input and which can vary a speed ratio to infinity, the infinitely variable transmission having an input shaft joined to a crankshaft of the engine, a toroidal continuously variable transmission and a fixed speed ratio transmission disposed on the input shaft in parallel with one another, a planetary gear set which joins the output shaft of the toroidal continuously variable transmission and output shaft of the fixed speed ratio transmission, a final output shaft joined to the planetary gear set and toroidal continuously variable transmission, a first clutch disposed between the planetary gear set and the output shaft of the fixed speed ratio transmission, and a second clutch disposed between the output shaft of the continuously variable transmission and final output shaft;

the input torque limiting device comprising:

a sensor for detecting an output/input speed ratio of the infinitely variable transmission which is an inverse of the speed ratio; and a microprocessor programmed to:

compute an input torque limit according to the output/input speed ratio of the infinitely variable transmission; and control the engine torque not to exceed the input torque limit, wherein the microprocessor comprises a map specifying a relation between the output/input speed ratio and input torque limit as follows:

when the output/input speed ratio is 0, the input torque limit takes a minimum value, and the input torque limit increases as the absolute value of the output/input speed ratio increases, and wherein the microprocessor computes the input torque limit based on the map.

2. An input torque limiting device for an infinitely variable transmission connected to an engine of a vehicle, into which the torque from the engine is input and which can vary a speed ratio to infinity, the infinitely variable transmission having an input shaft joined to a crankshaft of the engine, a toroidal continuously variable transmission and a fixed speed ratio transmission disposed on the input shaft in parallel with one another, a planetary gear set which joins the output shaft of the toroidal continuously variable transmission and output shaft of the fixed speed ratio transmission, a final output shaft joined to the planetary gear set and toroidal continuously variable transmission, a first clutch disposed between the planetary gear set and the output shaft of the fixed speed ratio transmission, and a second clutch disposed between the output shaft of the continuously variable transmission and final output shaft;

the input torque limiting device comprising:

a sensor for detecting an output/input speed ratio of the infinitely variable transmission which is an inverse of the speed ratio; and a microprocessor programmed to:

compute an input torque limit according to the output/input speed ratio of the infinitely variable transmission; and control the engine torque not to exceed the input torque limit, wherein the microprocessor comprises a map specifying a relation between the output/input speed ratio and input torque limit as follows:

when the output/input speed ratio is within a range from a first predetermined output/input speed ratio to a second predetermined output/input speed ratio, the input torque limit increases together with increase of the absolute value of the output/input speed ratio, the range comprising zero, and when the output/input speed ratio is in another range, the input torque limit is fixed regardless of the output/input speed ratio, and wherein the microprocessor computes the input torque limit based on the map.

3. An input torque limiting device for an infinitely variable transmission connected to an engine of a vehicle, into which the torque from the engine is input and which can vary a speed ratio to infinity, the infinitely variable transmission having an input shaft joined to a crankshaft of the engine, a toroidal continuously variable transmission and a fixed speed ratio transmission disposed on the input shaft in parallel with one another, a planetary gear set which joins the output shaft of the toroidal continuously variable transmission and output shaft of the fixed speed ratio transmission, a final output shaft joined to the planetary gear set and toroidal continuously variable transmission, a first clutch disposed between the planetary gear set and the output shaft of the fixed speed ratio transmission, and a second clutch disposed between the output shaft of the continuously variable transmission and final output shaft;

the input torque limiting device comprising:

a sensor for detecting an output/input speed ratio of the infinitely variable transmission which is an inverse of the speed ratio; and a microprocessor programmed to:

compute an input torque limit according to the output/input speed ratio of the infinitely variable transmission;

control the engine torque not to exceed the input torque limit; and set the smaller of a target engine torque calculated based on a running state of the vehicle and the input torque limit as a final target engine torque, and control the engine so that the engine torque is the final target engine torque.

* * * * *